United States Patent [19]
Marks et al.

[11] Patent Number: 5,553,214
[45] Date of Patent: Sep. 3, 1996

[54] SYSTEM FOR DELINEATING AND ANNOTATING AREAL REGIONS

[75] Inventors: Joseph W. Marks, Belmont; Murray S. Mazer, Somerville, both of Mass.; Kathleen Ryall, Carle Place, N.Y.; Stuart M. Shieber, Cambridge, Mass.

[73] Assignee: Digital Equipment Corporation, Maynard, Mass.

[21] Appl. No.: 111,153

[22] Filed: Aug. 24, 1993

[51] Int. Cl.⁶ .................................................. G06F 15/62
[52] U.S. Cl. .......................................................... 395/141
[58] Field of Search ................................. 395/133, 140, 395/141, 128, 129; 345/118, 121

[56] References Cited

U.S. PATENT DOCUMENTS 5,367,617  11/1994  Goossen et al. ...................... 395/142

*Primary Examiner*—Phu K. Nguyen
*Attorney, Agent, or Firm*—Kenneth F. Kozik

[57] ABSTRACT

A system for delineating partially- or fully-bounded areal regions of a map utilizes deformable templates, which it dynamically expands and contorts to conform to the boundaries of the regions. The system segments the map into a number of cells, with each cell relating, for example, to a pixel. The system then defines an "energy" field for the floor plan by assigning cells corresponding to boundary edges predetermined minimum energy values, cells corresponding to boundary interiors predetermined maximum energy values, and each non-boundary cell an energy value defined by the distance of the cell from the closest boundary edge cell. The system then iteratively manipulates a template over a selected region of the floor plan in an attempt to minimize the "potential" of the template, which is defined by a potential function that includes a "total energy score" and various size and test terms that encourage desired template deformations. The system determines the total energy score, by (i) scan converting the template sides, (ii) weighting the energy values of the cells through which the sides pass based on the lengths of the sides passing through the cells, and (iii) summing the scores. After determining the potential for all possible new locations for each of the vertices, the system selects next locations for each of the vertices and, as necessary, moves the vertices to these next locations to complete an iteration. At various times, the system raises the energy field and updates the template by altering the number of vertices. The system ends its manipulations of the template when it has performed a predetermined number of iterations or, in an energy field at its ceiling values, either the template vertices do not move between iterations or the potential of the template does not change. A user may then edit the template to conform the template more closely to the selected region. A user may also specify certain constraints on template deformation. In response, the system uses a modified potential function for controlling the deformation of the template.

40 Claims, 7 Drawing Sheets

SYSTEM FOR DELINEATING AND ANNOTATING AREAL REGIONS

FIELD OF THE INVENTION

The invention relates generally to systems for designating areal regions of a mapped geography and, more particularly, to systems for annotating maps, floor plans and so forth.

BACKGROUND

Computer-based, annotated floor plans are becoming widely used, as building climate control, security and so forth are coming more and more under computer control. The annotations relate to delineations of rooms and the designation of fixtures or features of interest within the rooms. These floor plans may also be useful for building maintenance if plumbing and wiring connections are accurately designated.

New technologies, such as tracking systems currently under development, use annotated floor plans or maps to trace the movements of people, office machinery, automobiles and so forth, within buildings, garages or grounds. Such systems require accurate delineations of rooms, parking spaces or other areas of interest, in order to designate correctly the location of a tracked person or object.

The determination of the current location is, at best, as accurate as the annotations of the floor plan or map. If, for example, the delineations and designations on a floor plan are imprecise, the system may place a person in a particular room, when the person is actually in an adjacent room or in a nearby corridor.

One type of annotation system requires that a user enter the coordinates and dimensions of every room, specifying the locations of doors, windows and other fixtures and attributes of interest. The system assimilates the information and produces an annotated floor plan image. Such data entry is time consuming and tedious. Also, the results are often imprecise because of inaccuracies or inconsistencies of the data entry.

To reduce the amount of data entry, various systems incorporate drawing packages. These packages allow a user to trace the outlines of rooms, windows, doors and so forth, either free-hand or on a graphic representation of a floor plan, such as a scanned blueprint image. The system then determines, from these tracings, the coordinates and dimensions of the rooms and the locations of the outlined fixtures and attributes. The tracings must designate fully-bounded regions, otherwise the system cannot determine the dimensions. These drawing features reduce somewhat the time required for data entry, although they do not eliminate the tedious aspect of entering and manipulating data by hand. Further, they do not eliminate the inaccuracies and inconsistencies associated with the hand-entered data. Since the systems determine the room dimensions from the hand-traced regions, they incorporate any drawing inaccuracies into their floor plan annotations.

Certain systems allow users to select one of a number of predetermined shapes and direct the sizing and orientation of the shape using a mouse. The user may not, however, change the underlying shape. The user can thus select a rectangular shape and instruct the system to enlarge, shrink or rotate the shape. The user cannot, for example, direct the system to change the rectangular shape into a triangle. These user-guided shapes can be used to delineate regions which correspond to one of the predetermined shapes. They can not, however, be used to delineate other shapes, and are thus of limited usefulness. Similarly some systems use "filling" techniques to identify fully-bounded regions, but these filling techniques do not work with partially-bounded regions.

SUMMARY

The invention is a system which automates the designation of areal regions of a graphic representation of a floor plan, a map and so forth. To delineate a partially-bounded or fully-bounded region, the system utilizes a deformable template, which it dynamically expands and contorts to conform to the boundaries of the region. In the case of a partially-bounded region, the system infers appropriate full boundaries based upon an evaluation function. We discuss this system in terms of floor plans, rooms and corridors, however, the system may be used with any type of map which includes regions that are distinguished from one another by one or more boundaries.

The deformable template used by the system is a polygon with movable vertices and stretchable sides, which the system manipulates until the sides and vertices conform to, and thus delineate, a desired region. A user positions a "seed" template within a region of interest, such as a room. The system simultaneously and iteratively moves the vertices and attached sides of the template in various directions toward the walls and other boundaries of the room, and thus, expands the template to cover the region. When a vertex of the template reaches a boundary, the system may then move the vertex along the boundary and stretch at least one of the attached template sides to conform to the contours of the boundary. At the same time, the system continues to move the other vertices of the template toward and, as appropriate, along the remaining boundaries of the room, until the template conforms to and covers the room.

The system specifies an "energy field" for the floor plan with points in the field defined by their respective distances from the cloest boundaries. The system then manipulates the template over the energy field in an attempt to minimize the "potential" of the template. The potential of the template is defined by a potential function that includes a "total energy score," which is a discrete approximation of the line integral of the template sides over the energy field, and certain test and size terms (discussed below), to encourage desirable deformations.

As discussed in more detail in a later section, the system uses a type of gradient descent technique on the multi-term template potential function to select the directions in which to deform the template. This function is evaluated during every iteration and the template vertices are each moved in a direction which attempts to minimize the potential function.

After various iterations, the system updates the template, the energy field and/or other operational parameters, i.e., increases or reduces the number of template vertices, raises the energy field and so forth, to encourage desirable deformations, as discussed in more detail below. The system then continues its iterative evaluation of the potential of the template in these changing contexts and its movement of the template vertices in the directions which attempt to minimize the potential function.

Specifically, the system initially segments the floor plan image into a number of "cells," with each cell corresponding to, for example, a pixel location in the image. Boundaries, such as walls, may be several pixels wide. The boundaries are thus represented by cells corresponding to edges of the boundaries and other cells corresponding to the interior of the boundaries. The system assigns each non-boundary cell an energy value, which relates to the distance of the cell from the closest boundary edge cell. It also assigns cells corresponding to the edges of the boundaries specific low energy values, and cells corresponding to the interiors of the boundaries specific high energy values.

When a seed template is placed in a region, the system calculates a template total energy score by (1) "scan converting" the sides, that is, determining which cells the template sides contact, (2) "scoring" the sides, that is, determining for each of these cells a score based on the energy value of the cell and the length of the template side which contacts or passes through the cell, and (3) summing the scores. The system then determines next locations for each of the template vertices by selecting a vertex and temporarily moving it from its current position to a new possible location, i.e., a neighboring cell, determining a template potential score for the deformed template by determining values for various test and size terms related to encouraging or discouraging certain types of vertex movement (discussed below), calculating the total energy value of the attached sides and summing the total energy value and the various movement-related terms. It then moves this vertex to another neighboring cell, and again calculates for the deformed template an associated potential score, and so forth until it has moved the selected vertex to every neighboring cell.

The system selects as the next location for this vertex the location associated with the lowest potential score, which may be one of the neighboring locations or the current location. It then moves the vertex back to its current location and repeats the same series of calculations for each of the remaining vertices.

Once the system has manipulated all of the vertices and selected locations for them, it completes a first iteration by placing the vertices in these next locations. Since the cell energy values are lower for the cells nearer the boundaries, this process moves template vertices toward the various boundaries. The system continues to perform iterations, moving the vertices and attached sides toward and, as appropriate, along the boundaries.

Alternatively, the system may place each vertex in its next location immediately after the system determines that location. Subsequent evaluations of the potential function are made with the vertex in the new location.

At various times, the system updates the energy field and/or the composition of the template. It thus raises the energy field, that is, changes the energy values assigned to the cells, and/or alters the number of vertices in the template. Such changes encourage the template first to expand, then essentially to stop expanding and conform as much as possible to the enclosing boundaries of the region and finally to contract to enclose the region. The system ends its manipulation of the template after a predetermined number of iterations or after the template stabilizes in an energy field whose parameters have reached ceiling values. The template is stabilized when either the vertices remain in the same cells from one iteration to the next or the potential of the template does not improve.

The system encourages certain movements of the vertices and discourages others, to promote appropriate template deformation. For example, it discourages movement of a vertex across a boundary edge or to a location which forces two or more sides of the template to intersect other than at a vertex. Further, the system prevents the movement of a vertex to a location which is off the map. The system or a user may place further constraints on template deformation, such as a maximum template size, as discussed in more detail below. To accommodate these constraints, the system uses a modified potential function for controlling the deformation of the template.

DESCRIPTION OF THE DRAWINGS

The above and further advantages of the invention may be better understood by referring to the following description in conjunction with the accompanying drawings, in which.

DETAILED DESCRIPTION

Figure 1:
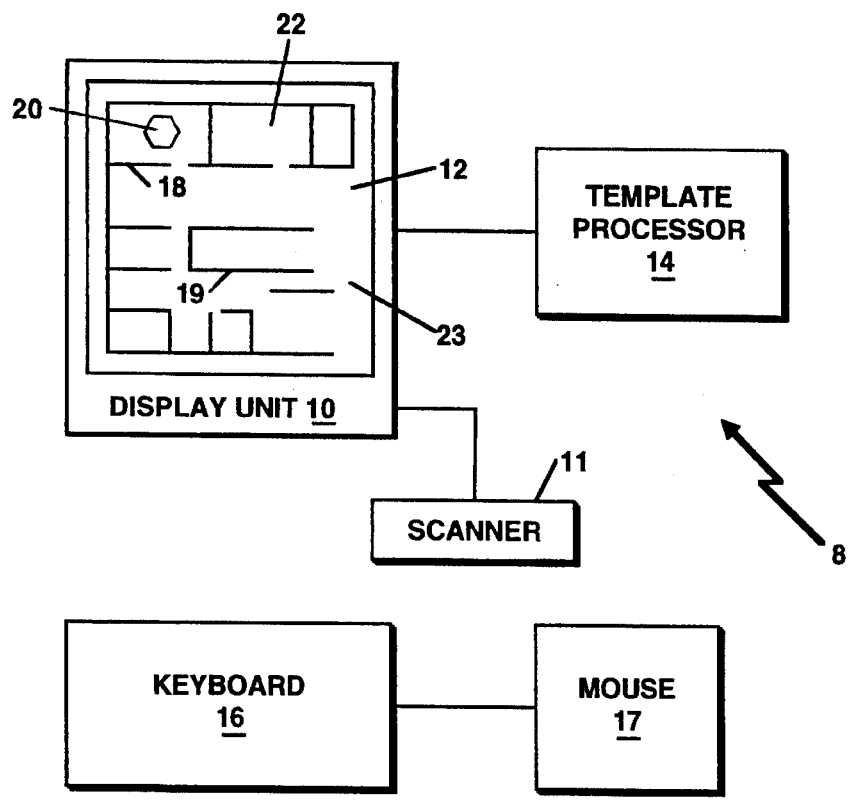
FIG. 1 is a functional block diagram of a system constructed in accordance with the current invention.

FIG. 1 depicts a system 8 which includes a display unit 10 for displaying a graphic representation 12 of a map, shown here as a floor plan, which has been scanned into the system by a scanner 11. A template processor 14 manipulates deformable templates 20 to designate areal regions of the floor plan, such as rooms 22 and corridors 23 which are bounded on various sides by walls 18 and panels 19. A user places a "seed" template 20, i.e., a relatively small template, in a region of the floor plan 12, using a keyboard 16 or mouse 17. The processor 14, as discussed below, stretches and contorts the template 20 to expand it and conform it to the contours of the boundaries of the region. The system then determines the dimensions and various other attributes of the region based on the size and shape of the deformed template 20.

Figure 2:
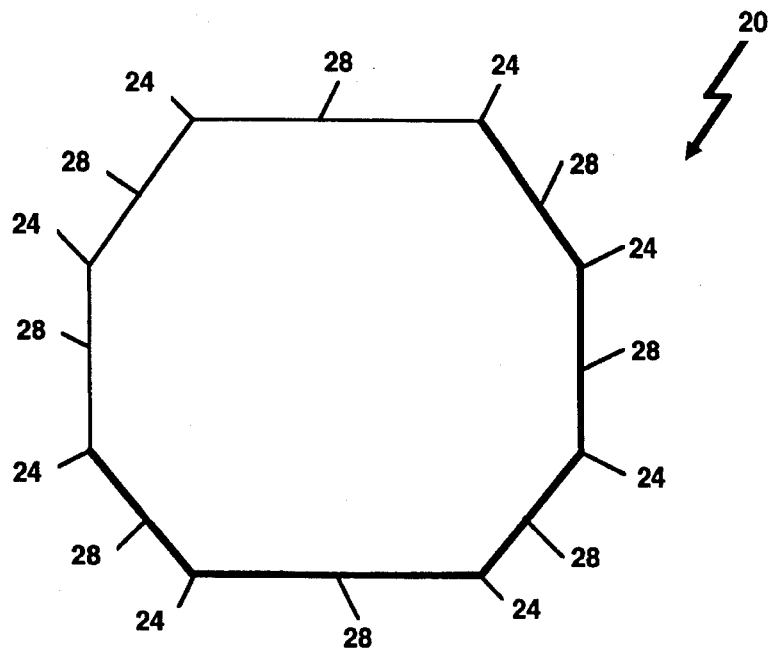
FIG. 2 is an illustration of a deformable template.

FIG. 2 illustrates the deformable template 20 in more detail. The template 20 is a polygon with multiple vertices 24 and associated sides 28. The template is shown here as an octagon, which is the default shape selected by the system. A user may increase or decrease the number of vertices 24 initially in a template, as desired. The user may also select an initial radius and an initial orientation for the seed template. Once a user or, by default, the system designates initial parameters for the number of vertices, the radius and the orientation of the template 20, and the user selects an initial position for the template 20, the processor 14 (FIG. 1) deforms the template by moving the vertices 24 in various directions, and thus, stretching the attached sides 28.

Figure 3:
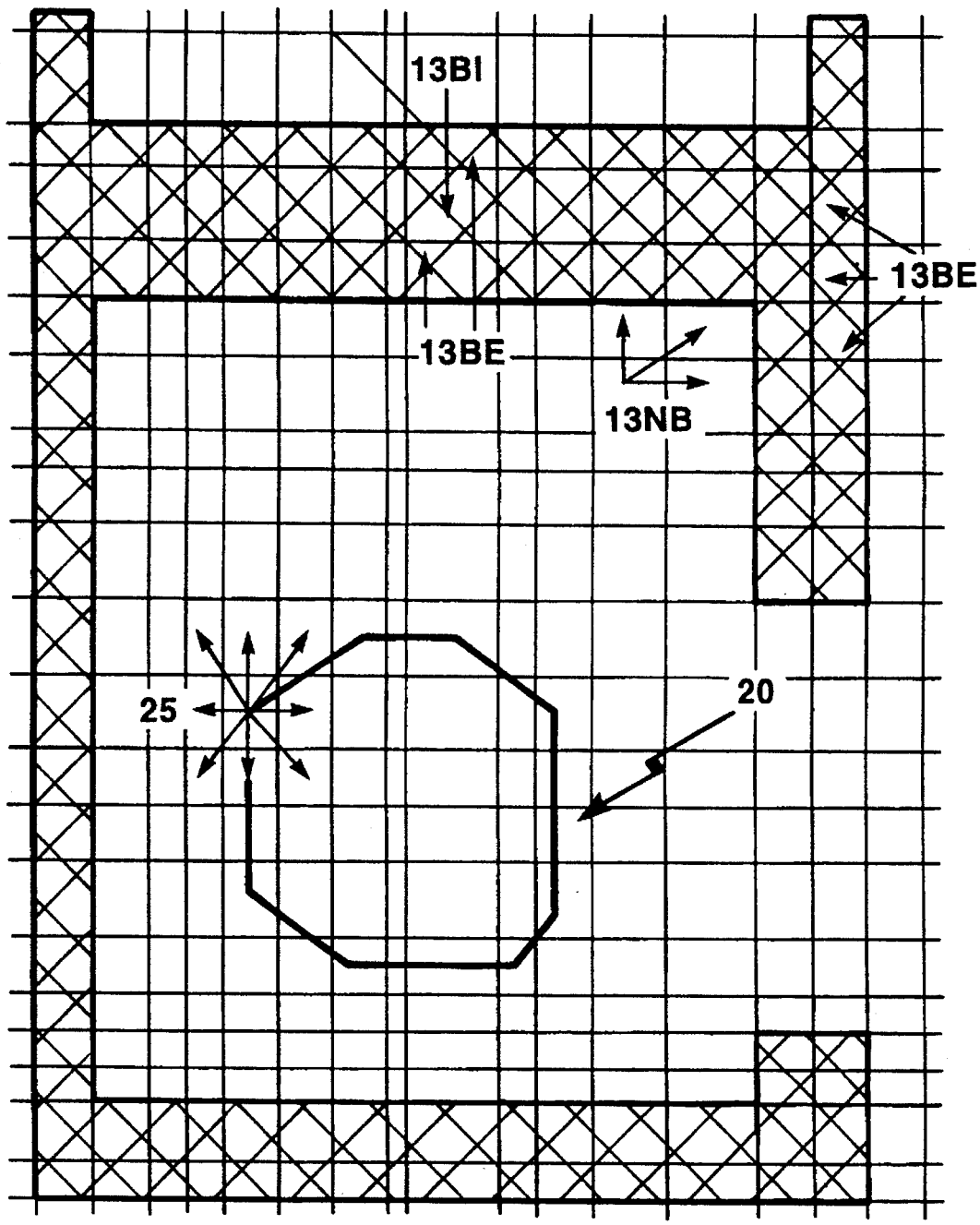
FIG. 3 is a diagram of a portion of a floor plan displayed by a display unit depicted in FIG. 1.

FIG. 3 depicts in more detail the upper left-hand corner of the floor plan displayed by display unit 10 of FIG. 1. This floor plan may be, for example, a scanned image of a blueprint. The system segments the floor into a number of cells 13, each of which is denoted in the drawing as a rectangle. Typically, each cell 13 corresponds to a pixel location of the displayed image.

There are three types of cells 13—boundary edge cells, $13_{BE}$; boundary interior cells, $13_{BI}$; and non-boundary cells, $13_{NB}$. As depicted in FIG. 3, the boundary edge cells are "black" cells with one or more "white" neighbor cells, the boundary interior cells are black cells with all black neighbor cells, and the non-boundary cells are white cells. Alternatively, the system may treat all black cells as boundary interior cells, white cells with one or more black neighbor cells as boundary edge cells and white cells with all white neighbor cells as non-boundary cells, or it may treat black boundary edge cells and white boundary edge cells differently, thereby specifying four types of cells—the two types of boundary edge cells, the boundary interior cells and the non-boundary cells. We discuss below the use of the three cell types, namely, $13_{BE}$, $13_{BI}$, and $13_{NB}$ cells specified in FIG. 3.

The system assigns each boundary edge cell $13_{BE}$ a specific low energy value, $e_{MIN}$, and assigns each boundary interior cell $13_{BI}$ a specific high energy value, $e_{MAX}$. If the system treats black and white boundary edge cells differently, it assigns each of these cells, respectively, a low energy value $e_{MIN-BLACK}$ or a low energy value $e_{MIN-WHITE}$. It then assigns each non-boundary cell $e_{NB}$ an energy value which relates to the distance of that cell from the closest boundary edge cell.

The energy values assigned to the boundary edge cells and non-boundary cells are initially negative while the energy value, $e_{MAX}$, assigned to each of the boundary interior cells is positive. As the energy field is raised throughout the template deformation process, the energy values assigned to non-boundary cells may become positive but remain below a specified non-boundary ceiling value. The energy values of the boundary edge cells remain non-positive and below a specified boundary edge ceiling value. As discussed in more detail below, the system changes the energy values at selected intervals to encourage the template first to expand relatively rapidly, then gradually to stop expanding and finally to contract.

The system may use any scheme which assigns values to the non-boundary cells based on their respective distances from the boundaries, such as a "prairie-fire" scheme. The scheme the system currently uses involves assigning cells values as it sweeps over them in each of four directions, i.e., top to bottom, bottom to top, left to right and right to left. The system initially assigns every non-boundary cell $13_{NB}$ a relatively large energy value, v. The system then selects a direction, for example, top to bottom. It starts at the top row of cells and the left-most column of cells and sweeps down the cells assigning values to the non-boundary cells as follows: if the current cell is the first cell in the sweep, its energy value is not changed; if the current cell is not the first in the sweep, its energy value depends on the preceding cell in the sweep, i.e., the cell examined immediately before the current cell. If the preceding cell is a boundary edge cell, the current cell is assigned a specific initial value $e_{INT}$; if the preceding cell is a non-boundary cell, the current cell is assigned a value which is the lower of its current energy value or the energy value of the preceding cell plus an increment value.

When the system reaches the end of the first column, it starts at the top of the second column and assigns energy values to the cells in the column in the same manner. The system continues assigning values until it has swept through every cell. Next, it selects another direction, for example, left to right, and starts at the first cell in the first row and assigns values to the cells in the row as set forth above. The system then sweeps through all of the rows, selects a next direction and repeats this process. Finally, the system selects the fourth direction and sweeps through the cells a fourth and last time. The system has thus defined for the floor plan an energy field, with relative minimums at the edges of the depicted boundaries.

When a user places a deformable template 20 (FIG. 2) within a region of the floor plan, the template processor 14 (FIG. 1) uses a gradient descent technique to determine the directions in which to expand the template to eventually conform it to the boundaries of the region. The controller then moves each of the template vertices in the direction that, at each iteration, attempts to minimize the template's potential.

The system determines a discrete approximation of the template potential by (1) calculating various movement-related terms, (2) scan converting and scoring the template sides, i.e., determining which cells the sides contact, assigning weighted values to the cells based on the lengths of sides passing through them and summing the weighted values for a total energy score, and (3) combining the total energy score and the movement-related terms. The scoring operation and the calculation of the movement-related terms are discussed in more detail below with reference to FIGS. 4(A–B).

In each iteration, the system tries as possible new locations for each of the vertices its neighborhood cells and selects a next location which minimizes the template's potential. This next location may be a neighboring cell or the current cell. When the template conforms to the boundaries of the region depicted on the floor plan, which are absolute minimums, the potential is in a local minimum. Even if one or more of the template sides do not conform to a depicted boundary, the template may still correctly delineate a region. For example, a template delineates a partially-bounded region when one or more of the template sides conform to the depicted boundaries and the template fills in the missing boundaries or segments of boundaries.

As discussed in more detail below, the system raises the energy field at various times during its iterative deformation of the template. To raise the energy field, the system increments every energy value by a selected amount. There are two associated functions which control the rate of growth of the energy field, namely, an interval function, specifying the number of iterations between changes to the energy field, and a step function, specifying the magnitudes of the changes.

Figure 4:
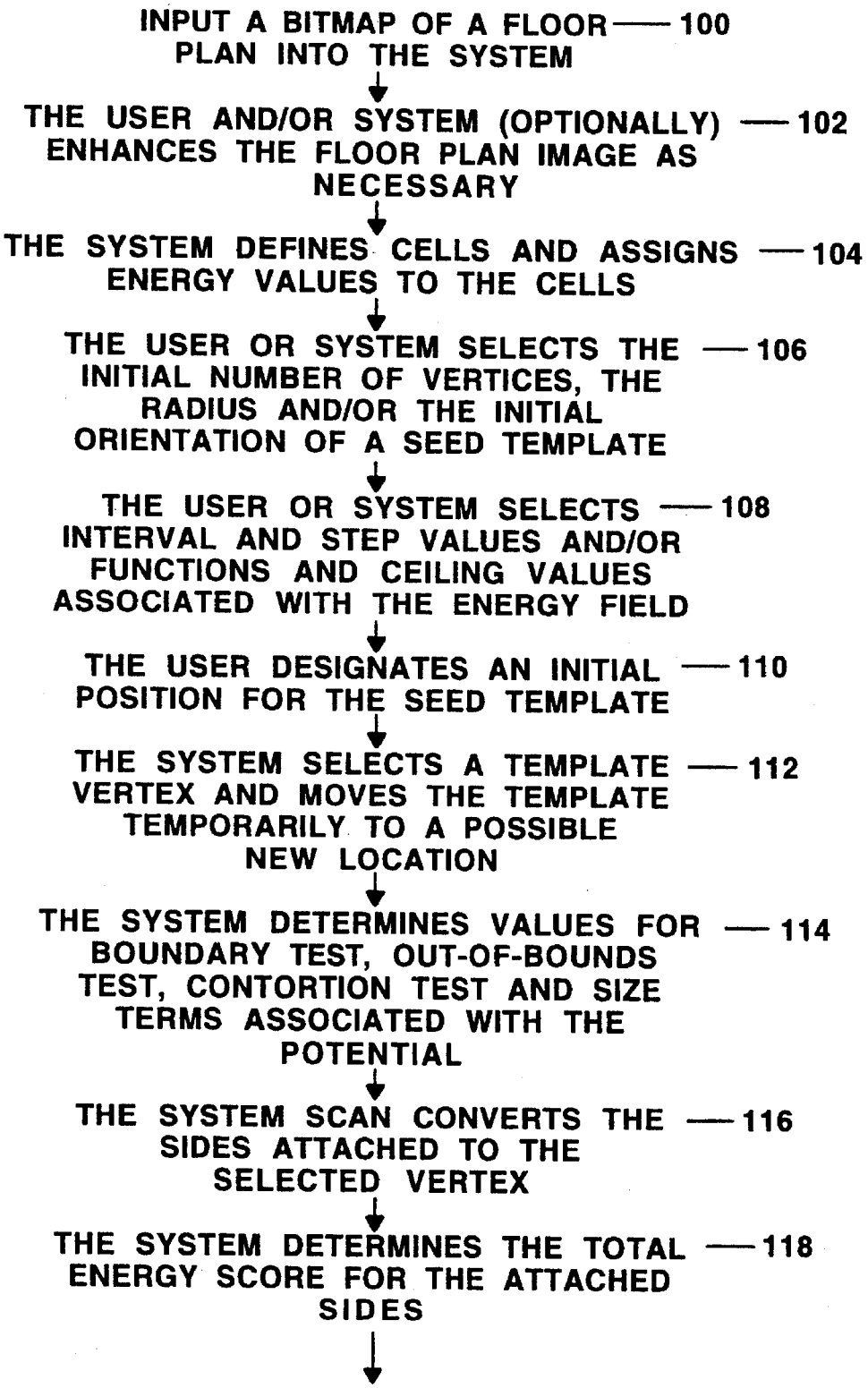
FIG. 4A and B are is a flow chart of the operations of the system of FIG. 1 in controlling the deformations of the template.
Figure 4A:
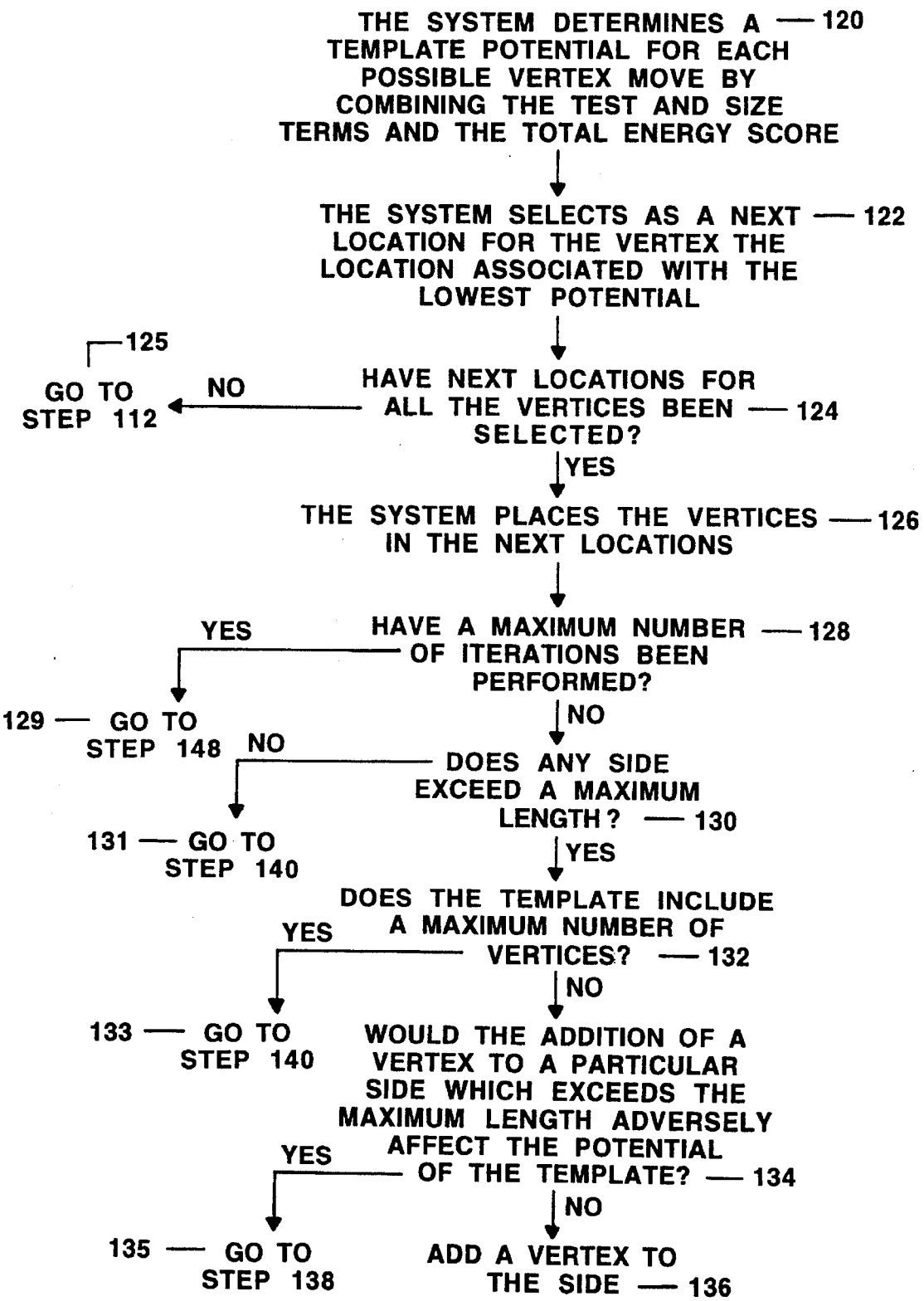
Figure 4B:
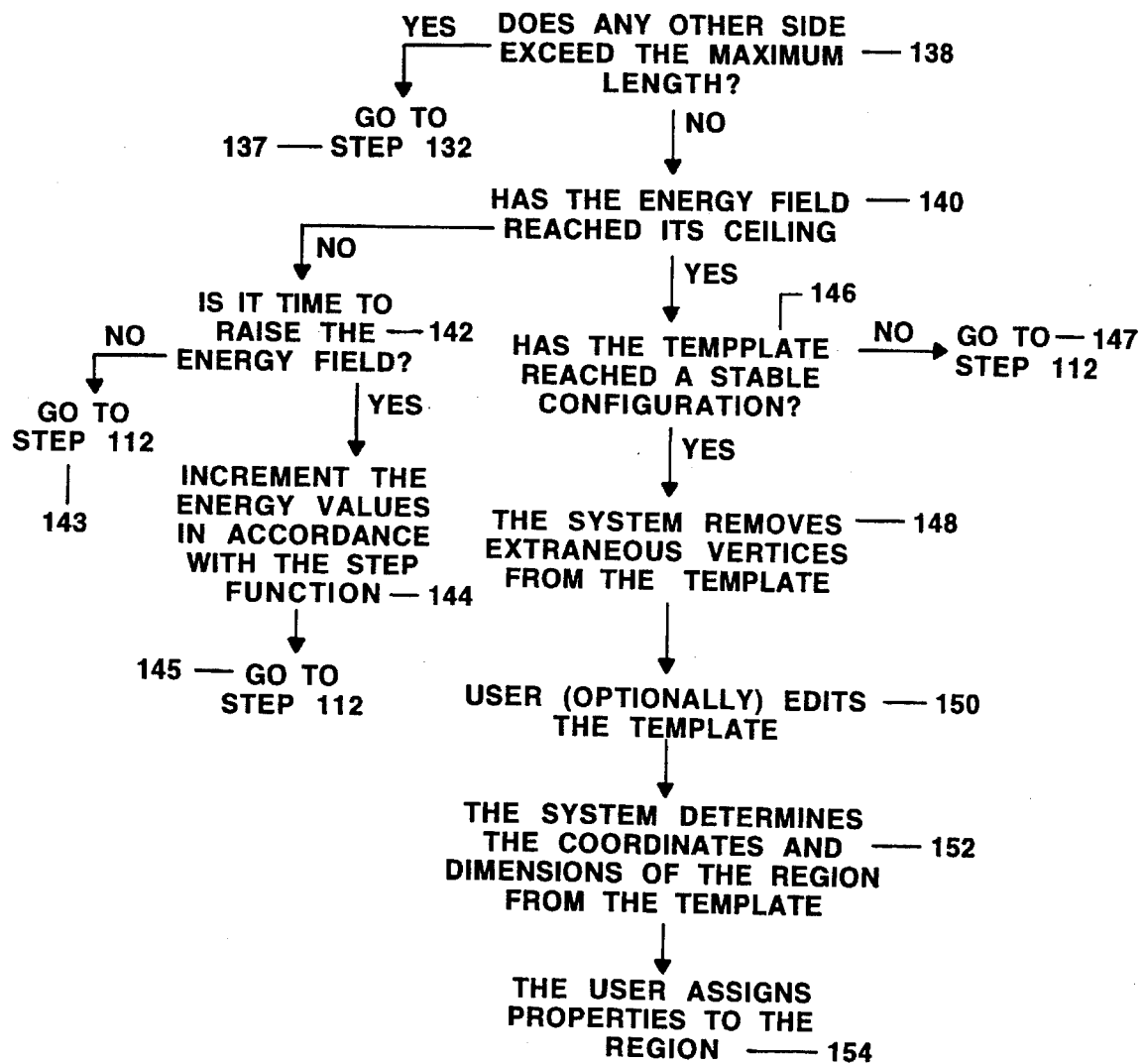

Referring now to FIGS. 3 and 4 (A–B), a bitmap of a floor plan is generated in the system by, for example, scanning in a blueprint (step 100). The system and, as necessary, the user may enhance the scanned-in image by smoothing the lines depicting boundaries, i.e., walls, moving individual "noisy" pixels and so forth (step 102). The system then defines cells 13 and assigns them energy values, as discussed above (step 104).

The user determines a region of interest of the floor plan and, as necessary, scrolls the display to ensure that the region of interest is displayed. The user and/or the system then selects for the seed template for this region the number of vertices, the radius "r" and the orientation of the template, that is, the angular position of a first vertex relative to a predetermined image axis (step 106). The seed template is essentially based on a circle of radius r with the vertices placed along the circumference. User-selected values for the radius and number of vertices may be rounded off, so that the vertices are placed properly within cells and do not overlap.

The user or the system next selects parameter values for interval and step functions associated with the rising energy field and ceiling, or maximum, values for the boundary and non-boundary cells (step 108). As discussed above, the functions specify the rate of growth of the energy field, that is, how often the energy field changes and by how much it changes each time, respectively, until it reaches the ceilings.

The user designates an initial position for the seed template within a particular region, for example, within a room 22 (step 110). There are essentially no constraints on the selection, and the user may thus designate any position within the region.

The system iteratively deforms the seed template, moving the template vertices toward the boundaries of the selected region which are depicted on the floor plan. In each iteration the system determines a best next location for each of the vertices, and then moves them to these locations. In the exemplary system each vertex can be moved one cell in any direction in an iteration, and thus, there are eight possible new locations for each vertex, as indicated by the arrows 25 in FIG. 3. The vertex may also remain in the same location between iterations.

To determine a best new location for a selected vertex, the system temporarily deforms the template by moving the vertex to a first neighboring cell (step 112). It then evaluates the potential of the newly deformed template, which includes the total energy score, a boundary test term, an out-of-bounds test term, a contortion test term and a maximum size term (steps 114–120).

The system determines if the new location is a boundary interior cell, and if so, sets the boundary test term to a relatively large value. Otherwise, it sets the boundary test term to zero. If this new location is out of bounds, or "off the map," the system sets the out-of-bounds test term to a relatively large value. Otherwise, it sets the term to zero. The system also determines if the deformed template is twisted, i.e., if two sides intersect at other than a shared vertex. If the template is twisted, the system sets the contortion term to a relatively large score. Otherwise, the system sets the term to zero. The system then determines if the new location causes the template to exceed a user-selected maximum size, as discussed in more detail below with reference to FIG. 5. If so, the size term is set to a relatively large value, and if not, it is set to zero.

The system next determines the total energy score. It scan converts the attached template sides to determine the cells through which the template sides pass (step 116). It then scores the sides (step 118). First it determines the length of the side passing through each of these cells using a variation of the Cleary-Wyvill technique discussed in an article entitled "Analysis of an Algorithm for Fast Ray Tracing Using Uniform Space Division," *Visual Computer*, 4:65–83 (1988). Next it weights the energy values assigned to these cells according to the lengths of the sides passing through them and sums the weighted values to produce the total energy score. The system next combines the total energy score, the various test terms and the size term to determine the value of the template's potential at this location (step 120). Alternatively, the system assigns the template a large potential value if any of the test or size terms associated with the location are non-zero, and thus, avoids performing the scan conversion and scoring processes for the locations which it has already determined are undesired.

Once the system has calculated the potential values for each of the eight possible new locations, the system compares these values and the value associated with the current location and selects as the next location for the vertex the location associated with the lowest potential value (step 122).

The system moves the vertex back to its earlier position, selects a next vertex and calculates potential values for each of the possible new locations for this vertex. It then selects a next location for this vertex by determining which of its current location or one of the new locations is associated with the lowest potential value (steps 122). After the system has determined next locations for all of the template vertices, it places the vertices in these locations to complete a first iteration (steps 124–126). Since the system at this time is using an energy field with negative values for all cells except the boundary interior cells, and since it selects locations based on the lowest potential scores, it moves the template vertices in directions which expand the template toward the region boundaries.

Figure 5:
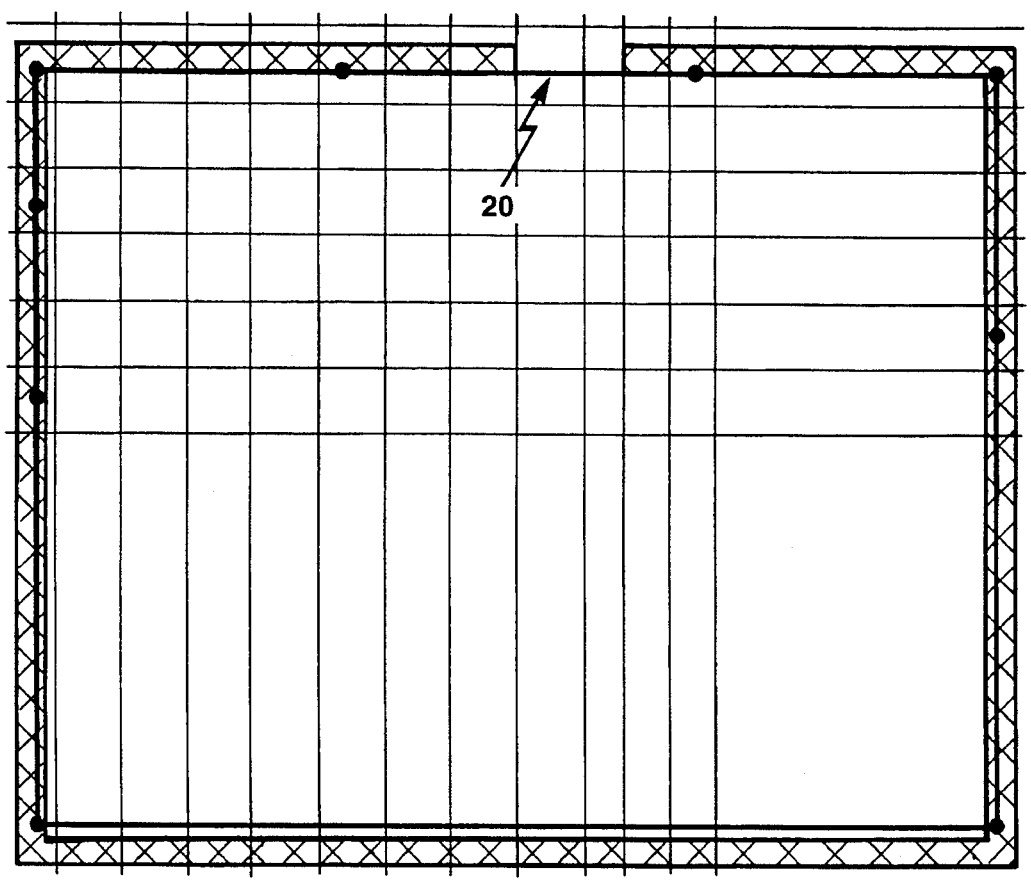
FIG. 5 depicts a template which has deformed to designate a partially-bounded region.

The system continues iteratively deforming the template. At selected intervals it raises the energy field by adding an incremental value to the energy values (steps 140–144). Additionally, the system may raise the energy field whenever the potential of the template does not change between iterations. By increasing the energy values of the non-boundary cells from their initial negative values toward positive values, the system initially encourages the template to expand, then gradually encourages it to stop expanding and conform to the region's depicted boundaries, and encourages it finally to contract to delineate the region. These changes in the energy field allow the template to conform to both fully-bounded and partially-bounded regions. The template will not, for example, continue to expand out through a missing segment of a wall but will eventually contract to the presumed location of the wall, as depicted in FIG. 5.

The user or the system may set a maximum length for a template side. When a side stretches to this maximum length, the system may then add a vertex to the side depending on parameter settings, such as a maximum number of vertices, and on the effect of the additional vertex on the template potential (steps 130–138). If the maximum number of vertices has been reached and/or the addition of the vertex adversely affects the template potential, the system disregards the maximum length parameter. Otherwise, the system adds the vertex, and moves it in the next and following iterations.

The system continues iteratively deforming the template in the rising energy field and with changing numbers of vertices until either a maximum number of iterations have been performed (step 128), or the configuration of the template stabilizes in an energy field whose parameters have reached ceiling values (step 146). The template is stabilized when (i) the template vertices do not move from one iteration to the next or (ii) the potential of the template does not change from one iteration to the next.

Once the system completes the template deformation, it removes duplicative or extraneous information from the template (step 148). It thus removes the middle of three collinear vertices since this does not change the shape of the template. The user can then, as desired, edit the template by adding or deleting vertices, pinning vertices to various locations and moving other vertices, and thus, the attached edges, to new locations (step 150). The system aids the user at this stage by expanding, i.e., increasing the spatial resolution of, user-selected portions of the map to show individual pixels.

When the editing is complete, the system determines the coordinates and the dimensions of the region from the template (step 152). The user can then designate properties for this region or otherwise annotate it (step 154). The user may select another region of interest of the floor plan and designate initial parameters and an initial position for a seed template. The system then repeats the deformation process, stretching and contorting the template to the new region of interest, and so forth until all user-selected regions have been delineated.

A user may reject a template's final position, if the template does not appear on the floor plan image to conform to the boundaries of the selected region. The user may then select another initial position for the template and again begin the deformation procedure, or increase or decrease the number of vertices in the seed template, as appropriate, and have the system deform the new seed template. The system also allows the user to re-run the deformation procedure with the same seed template, in the same initial starting position. For any of these procedures, the user may select different parameters (steps 106–108).

A user may place various constraints on the template deformations, depending on uses for the annotations. For example, a user may state a maximum length for the template sides or a maximum template area. The template may then delineate a region which is not otherwise indicated by the boundaries depicted in the floor plan.

Figure 6:
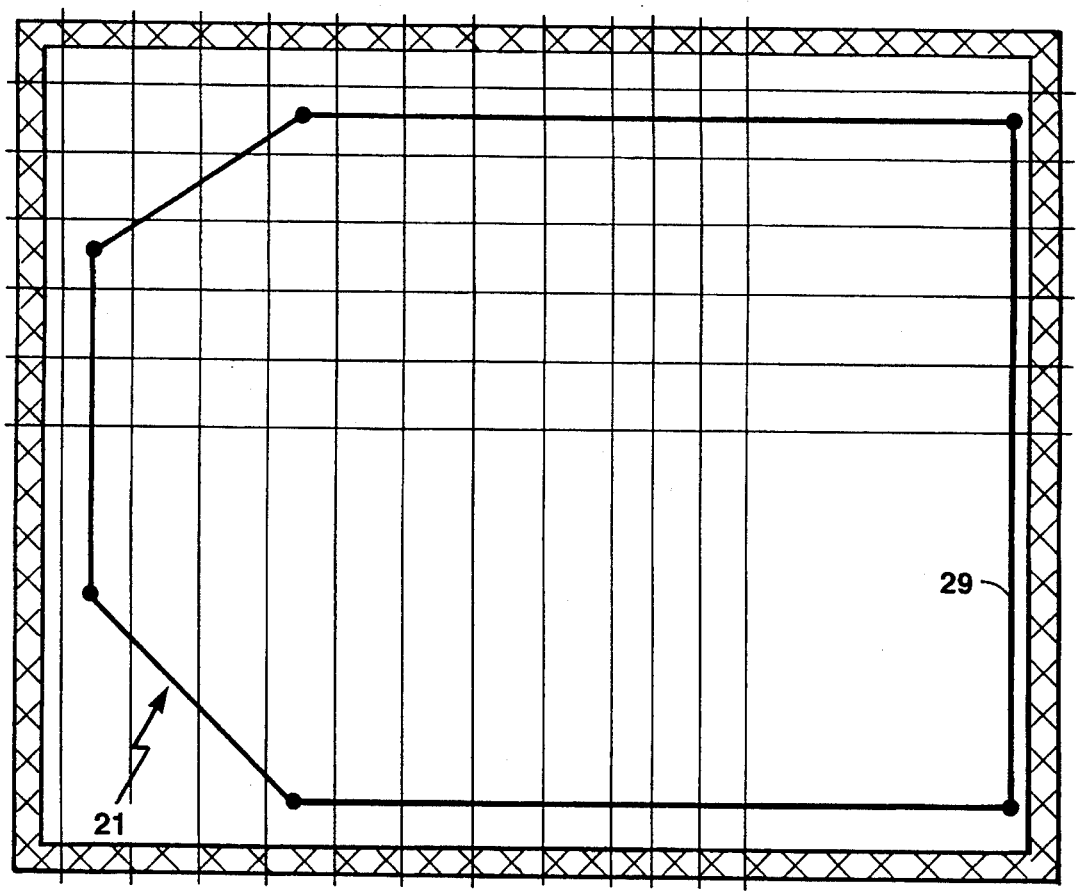
FIG. 6 depicts a template which has deformed in accordance with a modified potential function.

If a user is delineating the area covered by a surveillance camera, for example, the user may restrict the size of the template to the maximum range of the camera. Further, if the camera can view only the section of the region which is within a particular angle of the camera lens, the system may restrict the deformation of the template, by computing the value of an appropriate alternate form of the potential function. In this example, the system includes in the potential function a term for a maximum angle of separation, which allows the sides attached to the vertex which is closest to the location of the camera to separate by no more than a predetermined angle. The remainder of the template is not so constrained and can deform, up to the maximum allowed total size, to the floor plan boundaries. FIG. 6 depicts such a template 21.

Before the system begins a subsequent deformation procedure, it may redefine the energy field by treating one or more sides of a deformed template as new boundaries, and re-assigning energy values based on these new boundaries. The system then uses additional templates to delineate adjoining regions.

In summary, the system 10 automates the process of annotating a floor plan or map. A user simply places a seed template within a selected region and as appropriate selects various initial values, and the system attempts to conform the template to the boundaries of that region. The system deforms the template essentially until the template sides and vertices occupy the same locations as the depicted boundary edges of the region. The template fills in, in a partially-bounded region, missing boundaries or segments of boundaries. The system then determines from the template the dimensions and coordinates of the region. Accordingly, the system's annotation of the floor plan is accurate, without subjecting the user to time-consuming data entry. Further, thW system may delineate regions of the floor plan or map which are not contained within depicted boundaries, for example, regions which have a maximum size or a predetermined (angular) shape.

The system may be used to delineate areal regions of any scanned-in image, such as tax or identification forms, and to annotate the regions for further processing. For example, the portion of the form containing signatures or, as appropriate, pictures may be delineated for image processing and the portions containing numbers or characters may be delineated for optical character recognition processing.

The foregoing description has been limited to a specific embodiment of this invention. It will be apparent, however, that variations and modifications may be made to the invention, with the attainment of some or all of its advantages. Therefore, it is the object of the appended claims to cover all such variations and modifications as come within the true spirit and scope of the invention.

What is claimed is:

1. An annotation system including:

A. a display unit for displaying a map with various boundaries depicted on said map;

B. a processor for (i) segmenting said map into cells and (ii) assigning each cell an energy value by assigning cells corresponding to boundary edges predetermined minimum energy values, cells corresponding to boundary interiors predetermined maximum energy values and non-boundary cells values in between the minimum and the maximum values;

C. designation means for designating an initial position on said map for a deformable polygonal template and an initial shape for said template, said template having a plurality of vertices and attached sides, said designation means designating initial positions for said vertices; and D. manipulation means for deforming said template by moving a template vertex from said initial position of said template vertex to a position toward and along said boundaries, said manipulation means determining where to move said vertex to minimize a potential function based in part on a total energy score, said total energy score relating to a sum of said values assigned to the cells through which said attached template sides pass.

2. The annotation system of claim 1 wherein the processor assigns an energy value to a non-boundary cell based on the distance of the cell from the closest boundary.

3. The annotation system of claim 1, wherein the manipulation means determines the total energy scores associated with possible new locations of a selected template vertex by moving the selected vertex temporarily to the locations, and for each location:

i. scan converting the attached sides to determine the cells through which the sides pass;

ii. determining a weighted energy value for each of the attached sides based on the length of side through the respective cells and their assigned energy values; and iii. summing the weighted energy values.

4. The annotation system of claim 3, wherein the manipulation means further includes testing means for testing if the new location is on a cell which corresponds to a boundary interior, the testing means assigning a large value to a boundary test term included in the potential function if the new location is on a boundary interior.

5. The annotation system of claim 4, wherein the testing means includes means for testing the new location to determine if the location is off the map, the testing means assigning a large value to an out-of-bounds test term included in the potential function if the new location is off the map.

6. The annotation system of claim 5, wherein the testing means further includes means for testing each possible new location to determine if either of the attached sides intersect another side of the template other than at a shared vertex, the testing means assigning a large value to a contortion test term included in the potential function if the sides intersect.

7. The annotation system of claim 1, wherein the manipulation means selects as a next location for a template vertex a new location or a current location associated with a lowest value for the potential function.

8. The annotation system of claim 1 wherein the processor increments the energy values at selected intervals.

9. The annotation system of claim 8 wherein the processor refrains from incrementing the energy values beyond selected ceiling values.

10. The annotation system of claim 1, wherein the display unit displays a floor plan.

11. The annotation system of claim 1, wherein the display unit displays a scanned in form.

12. An annotation system including:
   A. a display unit for displaying an image with various boundaries depicted on said image;
   B. a processor for assigning (i) points on said image which are not on any boundaries values corresponding to the respective distances of said points from the closest boundaries, (ii) points on a boundary edge predetermined minimum values and (iii) points on a boundary interior predetermined maximum values;
   C. designation means for designating an initial position on said image for a deformable polygonal template, said template having a plurality of template vertices and attached sides, said designation means designating initial positions for said template vertices; and
   D. manipulation means for deforming said template by moving a template vertex from said initial position of said template vertex to a position toward and along the nearest boundaries which minimize the potential of said template.

13. The annotation system of claim 12 wherein the processor includes means for segmenting the image into a number of cells, with each cell defining a point of the image, and assigning each non-boundary cell a value corresponding to the distance of the cell from the closest cell which corresponds to an edge of a boundary and assigning cells which correspond to boundary edges predetermined minimum values.

14. The annotation system of claim 13 wherein the processor includes means for assigning cells which correspond to boundary interiors predetermined maximum values.

15. The annotation system of claim 12, wherein the manipulation means tests each possible next location to determine:
   i. if the location is on a boundary interior, or
   ii. if the location is off the map, and
   iii. if so, the manipulation means assigning a large value to an associated term in the potential function.

16. The annotation system of claim 12, wherein the manipulation means tests each possible next location to determine if either of the sides attached to the vertex intersect another side of the template other than at a shared vertex, and if so, assigning a large value to a contortion term in the potential function.

17. The annotation system of claim 12, wherein the manipulation means selects as a next location for a template vertex a new location or a current location associated with a lowest value for the potential function.

18. The annotation system of claim 12 wherein the processor increments the energy values at selected intervals.

19. The annotation system of claim 18 wherein the processor refrains from incrementing the energy values above selected ceiling values.

20. The annotation system of claim 12 wherein the processor includes means for editing the map to more clearly depict the boundaries.

21. The annotation system of claim 12 wherein the processor includes means for editing the template under the direction of a user.

22. The annotation system of claim 12 wherein the processor includes:
   a. means for testing the lengths of the sides against a selected maximum length,
   b. means for determining if the number of template vertices exceeds a selected maximum number; and
   c. means for adding a vertex to a side which exceeds the maximum length, said means adding the vertex if the number of vertices does not exceed the selected maximum number.

23. The annotation system of claim 22 wherein the means for adding a vertex includes a means for determining if the inclusion of a vertex in a side which exceeds the selected maximum length adversely affects the potential of the template, the means for adding a vertex refraining from adding a vertex if the potential of the template is adversely affected.

24. A method of delineating a region of a map, said map having a plurality of points, and having various boundaries depicted on said map, said method comprising:
   A. designating an energy field by assigning a value to each point on said map, said value assigned to a point relating to the distance of said point from said boundary closest to said point;
   B. designating an initial position on said map for a deformable polygonal template, said template having a plurality of template vertices and attached sides;
   C. determining a template potential function in response to said energy field and in response to said plurality of template vertices; and
   D. deforming said template to conform said template to said region of said map by minimizing said template potential function over said energy field.

25. The method of delineating regions of a map of claim 24, wherein the step of assigning values to points on the map to designate an energy field includes the steps of:
   a. segmenting the map into cells,
   b. assigning each non-boundary cell an energy value relating to the distance of the cell from the closest boundary;
   c. assigning cells corresponding to boundary edges predetermined minimum energy values; and
   d. assigning cells corresponding to boundary interiors predetermined maximum values.

26. The method of delineating regions of a map of claim 25, wherein the step of deforming the template includes the steps of:
   e. moving a selected vertex from a current location to a possible new location;
   f. determining values for test and size terms in the potential function;
   g. scan converting the attached edges;
   h. determining the lengths of the attached edges passing through the respective cells and weighting the energy values of the cells based on the lengths to produce weighted energy values;
   i. combining the weighted energy values to determine a total energy score;
   j. moving the selected vertex to a possible new location and repeating steps f–i;
   k. repeating step j until the vertex has been moved to every possible new location;

l. determining a value of the potential function at each possible new location based on a combination of the values of the test and size terms and the total energy score;

m. selecting as a next location for the vertex the new location or the current location associated with the lowest potential value;

n. returning the vertex to the current position;

o. repeating steps e–n for a next selected vertex until next locations for a predetermined number of the vertices have been determined;

p. placing the predetermined number of template vertices in the next locations; and q. repeating steps e–p until a maximum number of iterations have been performed.

27. The method of delineating regions of a map of claim 26 wherein the predetermined number of template vertices is one.

28. The method of delineating regions of a map of claim 26 wherein the predetermined number of template vertices corresponds to all of the vertices on the template.

29. The method of delineating regions of a map of claim 26, wherein the step of determining values for test and size terms includes:

i. determining if the new location is on a boundary interior; and ii. if so, assigning a large value to a boundary test term in the potential function.

30. The method of delineating regions of a map of claim 29, wherein the step of determining values for test and size terms further includes:

iii. determining if the attached sides intersect other sides of the template at other than a shared vertex; and iv. if so, assigning a large value to a contortion test term in the potential function.

31. The method of delineating regions of a map of claim 30, wherein the step of determining values for test and size terms further includes:

v. determining if the new location is off the map;

vi. if so, assigning a large value to an out-of-bounds test term in the potential function.

32. The method of delineating regions of a map of claim 26, wherein the method further includes the step of raising the energy field after a selected number of iterations.

33. The method of delineating regions of a map of claim 32 wherein:

i. the step of designating the energy field includes the step of selecting ceiling values for boundary and non-boundary cells; and ii. the step of raising the energy field includes the step of refraining from raising the energy field above the selected ceiling values.

34. The method of delineating regions of a map of claim 32, wherein the step of repeating steps e-p further includes refraining from repeating the steps if, in an energy field which has reached ceiling values, the template vertices remain in positions selected in a previous iteration or the potential of the template does not change from one iteration to a next iteration.

35. The method of delineating regions of a map of claim 26 wherein the method further includes the steps of:

i. determining if a side exceeds a selected maximum length;

ii. if so, determining* if the number of vertices is less than a selected maximum;

iii. if so, determining if an addition of a vertex to the side which exceeds the selected maximum length adversely affects the potential of the template;

iv. if the addition of a vertex does not adversely affect the potential, including the additional vertex in the side; and v. repeating steps i–iv for every side.

36. The method of delineating regions of a map of claim 24, wherein the method further includes the steps of:

i. scanning in a map; and ii. editing the map to more clearly depict the boundaries.

37. The method of delineating regions of a map of claim 24, wherein the method further includes the step of editing the template in accordance with directions from a user after the deformation step to more closely conform the template to the region.

38. The method of delineating regions of claim 367 wherein the step of editing the template further includes one or more of the following:

i. adding vertices, ii. deleting vertices, iii. moving vertices.

39. A method for delineating a region of a map, said map having boundaries depicted thereon, by conforming a template to said region, said method comprising:

A. segmenting said map into a plurality of cells;

B. assigning an energy value to each cell on said map, said energy value assigned to a cell being based upon the distance of said cell from said boundary closest to said cell, said assigning of said energy values defining an energy field;

C. placing said template at an initial position within said region;

D. determining a potential for said template in response to said initial position of said template in said energy field; and E. deforming said template so as to minimize said potential of said template in said energy field by conforming said template to said region.

40. An apparatus for delineating a region of a map, said map having boundaries depicted thereon, by conforming a template to said region, said apparatus comprising:

A. means for defining a plurality of cells on said map;

B. means for assigning an energy value to each cell on said map, said energy value assigned to a cell being based upon the distance of said cell from said boundary closest to said cell, said assigning of said energy values defining an energy field;

C. means for designating an initial position within said region for said template;

D. means responsive to said initial position of said template for determining a potential for said template in said energy field; and E. manipulation means for deforming said template so as to minimize said potential of said template in said energy field by conforming said template to said region.

* * * * *